United States Patent [19]

Purcell et al.

[11] Patent Number: 5,812,437
[45] Date of Patent: Sep. 22, 1998

[54] PROGRAMMABLE LOGIC UNIT FOR ARITHMETIC, LOGIC AND EQUALITY FUNCTIONS

[75] Inventors: Stephen C. Purcell, Mountain View; John Sheldon Thomson, Santa Clara, both of Calif.

[73] Assignee: Chromatic Research, Inc., Mountain View, Calif.

[21] Appl. No.: 541,562

[22] Filed: Oct. 10, 1995

[51] Int. Cl.[6] .................................. G06F 7/50; G06F 7/04
[52] U.S. Cl. ................................. 364/724.17; 364/716.01; 326/37
[58] Field of Search .............................. 364/716, 716.01, 364/716.07; 326/37

[56] References Cited

U.S. PATENT DOCUMENTS

| 4,541,067 | 9/1985 | Whitaker | 364/716 |
| 5,079,446 | 1/1992 | Hölzle | 326/37 |
| 5,398,198 | 3/1995 | Mahant-Shetti et al. | 364/716 |
| 5,436,574 | 7/1995 | Veenstra | 364/716 |
| 5,463,327 | 10/1995 | Hastie | 326/37 |

*Primary Examiner*—David H. Malzahn
*Attorney, Agent, or Firm*—Skjerven, Morrill, MacPherson, Franklin & Friel; Edward C. Kwok

[57] ABSTRACT

An arithmetic logic unit is disclosed herein which overcomes problems in the art discussed above. In accordance with the present invention, an ALU includes a plurality of individual programmable logic units which selectively implement arithmetic, logic, and equality comparison operations. One bit of each of two or more input signals is provided to respective ones of the logic units. One of a plurality of function signals, each of which being set equal to the truth table for a particular arithmetic, logic, or equality operation, is selectably provided to each of the logic units. Each of the logic units multiplexes the function signal provided thereto according to the particular bits of the input signals received therein to generate first and second output signals. These first and second output signals provided by each of the logic units are combined in an adder such that the resulting bit pattern represents the selected arithmetic, logic, or equality operation of the two or more input signals.

9 Claims, 2 Drawing Sheets

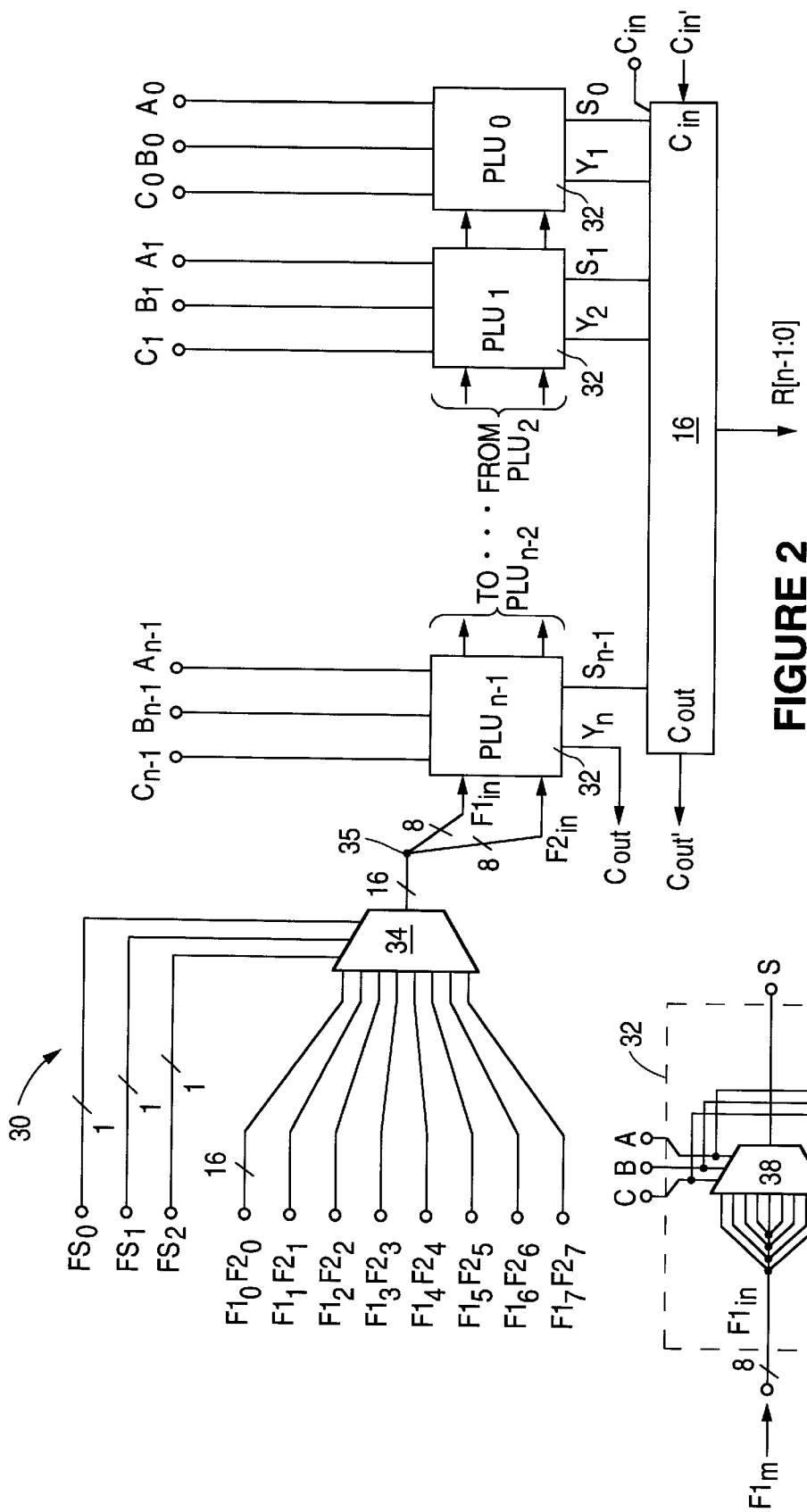

PROGRAMMABLE LOGIC UNIT FOR ARITHMETIC, LOGIC AND EQUALITY FUNCTIONS

BACKGROUND

In the field of computers there is a continuing desire to reduce die size while optimizing performance. Thus, any structure or method which results in a savings of silicon real estate without degrading performance is very valuable.

The three primary functions of conventional arithmetic logic units (ALU), arithmetic, binary logic, and equality comparison, are typically implemented using separate structures. FIG. 1 shows a conventional 3-input, n-bit ALU 10 configured to receive three n-bit input signals A[n-1:0], B[n-1:0], and C[n-1:0]. ALU 10 includes n full adders (FA) 12, each of which receives a respective bit of each of the three input signals A[n-1:0], B[n-1:0], and C[n-1:0]. Note that each bit of input signals A[n-1:0] and B[n-1:0] signals is gated with a control signal A/S via a respective one of exclusive OR (XOR) gates 14 to select between addition and subtraction. When ALU 10 is to perform addition, A/S is low so as to pass signals A[n-1:0] and B[n-1:0] unaltered to respective ones of FAs 12. Accordingly, when ALU 10 is to perform subtraction, A/S is set high to invert signals A[n-1:0] and B[n-1:0]. Each of adders 12, in response to 1 bit received from each of input signals A[n-1:0], B[n-1:0], and C[n-1:0], generates a sum bit S and a carry bit Y. A conventional 2-input carry propagate adder 16 combines the n sum bits S and the n carry bits output from FAs 12 with a two carry-in bits $C_{in}$ and $C_{in}'$ and, in response thereto, provides a result signal $R_{arith}$[n-1:0] to a first input of a 2:1 multiplexer (MUX) 18 and also outputs a carry-out bit $C_{out}'$, as shown in FIG. 1. Note that adder 16 has two carry-in bits $C_{in}$ and $C_{in}'$ to allow for simultaneously taking the 2's complement of up to two of the input signals A[n-1:0], B[n-1:0], and C[n-1:0]. Also note that $C_{out}$, e.g., $Y_n$, and $C_{out}'$ are usually discarded.

The three input signals A[n-1:0], B[n-1:0], and C[n-1:0] are also provided to a conventional 3-input programmable logic unit (PLU) 20. In response to an m-bit control signal CONTROL, PLU 20 selectably performs one of a number of logical operations such as AND, OR, and XOR in a bit-by-bit manner upon the input signals A[n-1:0], B[n-1:0], and C[n-1:0] and provides a result $R_{PLU}$[n-1:0] to a second input of MUX 18. A control signal SELECT coupled to the control terminal of MUX 18 selects which of the inputs of MUX 18, e.g., $R_{arith}$[35:0] or $R_{PLU}$[35:0], is output as result R[n-1:0]. In this manner, ALU 10 may be switched between an arithmetic mode and a logic mode.

Two of the input signals, A[n-1:0] and B[n-1:0], are also provided to a 2-input equality detector circuit 22 which performs a bit-by-bit comparison of A[n-1:0] and B[n-1:0]. If all of the bits of A[n-1:0] and B[n-1:0] are equal to one another, equality detector 22 outputs a high EQUALS signal; otherwise, equality detector 22 provides a low EQUALS signal. Typical equality detector circuits such as circuit 22 perform equality detection by first subtracting A[n-1:0] from B[n-1:0] and then zero detecting each bit of the resultant signal using NOR gates. Since, however, current technology allows for the simultaneous NOR gating of only 4 to 5 bits, zero detecting a signal with greater than 4 or 5 bits requires multiple level tree structure of such NOR gates. Thus, the gate delay associated with such zero detecting increases as the bit-size of the input signals increase. For instance, a 36-bit equality detector circuit 22 would require 3 levels of NOR gates, one to compress 36 bits to 9 bits, a second to compress 9 bits to 2 bits, and a third to compress 2 bits to 1 bit. Accordingly, zero-detecting conventional equality circuits 22 may be very slow when configured to receive inputs signals having a large number of bits.

Further, because ALU 10 requires n full adders 12, a 2-input carry propagate adder 16, a 3-input n-bit PLU 20, a 2-input n-bit equality detector circuit 22, and an n-bit 2:1 multiplexer 18 to selectably perform arithmetic logic, and equality detection, the area required to fabricate ALU 10 is significant. Because of the desire to minimize the layout area of integrated circuits, it would be advantageous for an ALU capable of selectably performing either arithmetic, logic, or equality detection functions to be fabricated using less hardware, thereby saving valuable silicon real estate.

SUMMARY

An arithmetic logic unit is disclosed herein which overcomes problems in the art discussed above. In accordance with the present invention, an ALU includes a plurality of individual programmable logic units which selectively implement arithmetic, logic, and equality comparison operations. One bit of each of two or more input signals is provided to respective ones of the logic units. One of a plurality of function signals, each of which being set equal to the truth table for a particular arithmetic, logic, or equality operation, is selectably provided to each of the logic units. Each of the logic units multiplexes the function signal provided thereto according to the particular bits of the input signals received therein to generate first and second output signals. These first and second output signals provided by each of the logic units are combined in an adder such that the resulting bit pattern represents the selected arithmetic, logic, or equality operation of the two or more input signals.

BRIEF DESCRIPTION OF THE DRAWINGS

FIG. 2 is a block diagram of an arithmetic logic unit in accordance with the present invention; and FIG. 3 is a schematic diagram of a programmable logic unit used in accordance with the present invention.

DETAILED DESCRIPTION

Figure 1:
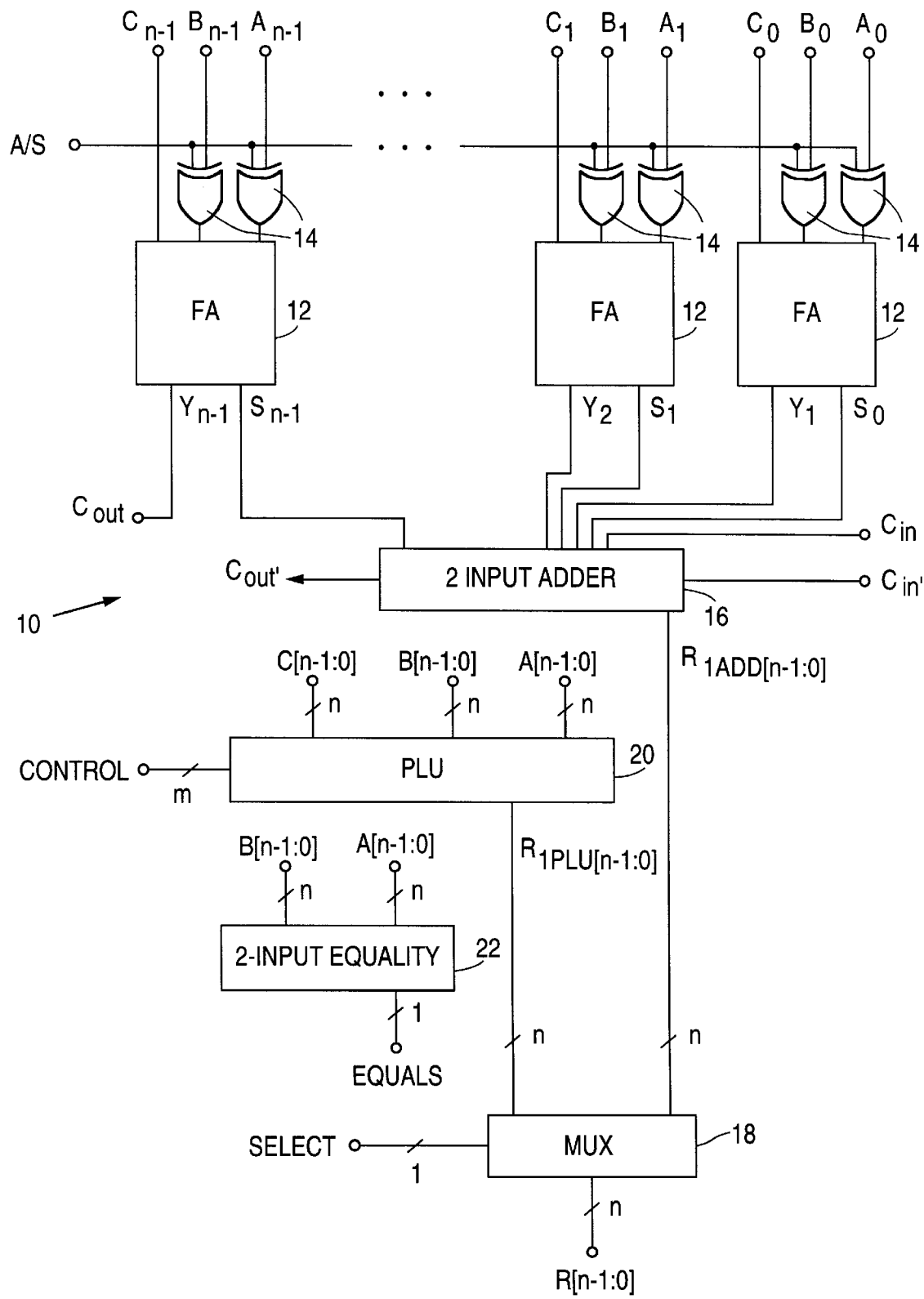
FIG. 1 is a block diagram of a conventional arithmetic logic unit.

FIG. 2 shows an n-bit, 3-input ALU 30 in accordance with the preferred embodiment of the present invention. Those components common to ALU 30 and conventional ALU 10 are appropriately labelled with the same numerals.

ALU 30 includes n PLUs 32 each of which is coupled to receive a respective bit of each of input signals A[n-1:0], B[n-1:0] and C[n-1:0]. An 8:1 MUX 34 has eight input ports each coupled to receive a respective 16-bit signal representative of two 8-bit function signals F1 and F2, as indicated in FIG. 3. Three function select control signals $FS_0$–$FS_2$ are coupled to the control ports of MUX 34 and select which of the 16-bit signals MUX 34 passes to port 35. After passing through MUX 34, the selected 16-bit signal is divided into its two 8-bit function signals F1 and F2 at port 35 and are then provided to each of PLUs 32 via ports $F1_{in}$ and $F2_{in}$, respectively.

Each of PLUs 32 outputs a sum bit S and a carry bit Y which are provided to a 2-input, n-bit carry propagate adder 16. Adder 16 is preferably a carry look-ahead adder, but may be any suitable n-bit carry propagate adding circuit. Two carry-in bits $C_{in}$ and $C_{in}'$ are also provided as inputs to adder 16. In response to $C_{in}$, $C_{in}'$, and the sum bits S and carry bits Y generated by PLUs 32, adder 16 outputs an n-bit result R[n-1:0] and a one-bit carry out signal $C_{out}'$. Note that the carry signal $Y_n$ output from $PLU_{n-1}$ is provided as a carry out bit $C_{out}$ and is usually discarded.

FIG. 3 shows a schematic diagram of PLU 32, wherein A, B, and C indicate one bit of input signals A[n-1:0], B[n-1:0], and C[n-1:0], respectively. Bits A, B, and C are provided to the control ports of an 8:1 MUX 38 and thereby select which bit of function signal F1 provided by MUX 34 (FIG. 2) is passed as the sum bit S. In a similar manner, bits A, B, and C select which bit of function signal F2 provided by MUX 34 will be passed via 8:1 MUX 40 as the carry bit Y.

ALU 30 may perform arithmetic, logic, and equality functions using the same PLUs 32, thereby resulting in a savings of not only hardware overhead but also of valuable silicon surface area. As described above, the three function select control signals $FS_0$–$FS_2$ select which of the eight 16-bit signals F2,F1 will be provided to port 35 and, thus, which of function signals F2 and F1 will be provided to MUX 40 and MUX 38, respectively, of each PLU 32. Each of the function signals F2 and F1 is a bit pattern which, when collectively provided to respective MUXs 38 and 40, results in PLUs 32 implementing a specific function of the input signals A[n-1:0], B[n-1:0], and C[n-1:0].

ALU 30 selectively implements arithmetic, logic, and equality operations by selectively providing a combination of function signals F1 and F2 to MUXs 38 and 40, respectively, of each PLU 32. Thus, to implement the addition of A[n-1:0], B[n-1:0], and C[n1:0], control signals $FS_0$–$FS_2$ are appropriately set so as to allow, for instance, signal $F1_0F2_0$ is pass to port 35. In such a case, $F1_0$ is a string set equal to the truth table for the sum generation of a 3-input add, e.g., "01101001", and $F2_0$ is a string set equal to the truth table for the carry generation of a 3-input add, i.e., $F2_0$="00010111". In this manner, each PLU 32 will, in response to received bits A, B, and C of respective input signals A[n-1:0], B[n-1:0], and C[n-1:0], provide a sum bit S via MUX 38 and a carry bit Y via MUX 40 to adder 16. The n sum bits S and n carry bits Y are combined in adder 16 and then provided as result R[n-1:0] and a $C_{out}$ bit, where R[n-1:0]=A[n-1:0]+B[n-1:0]+C[n-1:0]. Note that for addition, carry in signals $C_{in}$ and $C_{in}'$ are both set low.

Subtraction may be implemented in a similar manner by providing a 16-bit signal $F1_nF2_n$ containing bit pattern which correspond to truth tables for the generation of sum S and carry Y bits for 3-input subtraction. For instance, where 16-bit signal $F1_1F2_1$ is used for the subtraction operation C-B-A, $F1_1$ is set equal to "01101001" and $F2_1$ is set equal to "10001110". Note that when subtracting two of the inputs, both carry ins $C_{out}$ and $C_{out}'$ to adder 16 are set high. Note that other arithmetic operations, such as C+B-A, may be similarly implemented by selecting an appropriate 16-bit signal F1F2.

Logic operations are implemented by setting function signal $F1_n$ equal to the truth table for a particular logic operation. For instance, to implement a three-input AND operation, control signals $FS_0$–$FS_2$ are set such that, for instance, 16-bit signal $F1_2F2_2$ is provided to port 35. In this case, $F1_2$ is set equal to "00000001". In this manner, the sum bit S generated by each PLU 32 and provided to adder 16 will be the result of a logic AND operation of respective bits A, B, and C of input signals A[n-1:0], B[n-1:0], and C[n-1:0]. Note that all logic operations the function signal $F2_n$, i.e., $F2_2$ in the above example of AND operation, are set equal to an 8-bit zero string such that the carry bits Y generated by PLUs 32 are zero. In this manner, the sum bits S generated by PLUs 32, which represent the result of the logic operation, pass unaltered through adder 16. Thus, in the above example the output of adder 16, R[n-1:0], equals (bit-by-bit) A[n-1:0] AND B[n-1:0] AND C[n-1:0].

To perform a bit-by-bit equality comparison of 2 inputs, A[n-1:0] and B[n-1:0], $F2_n$ is set equal to an 8-bit zero string. Since we want to generate a high sum bit $S_x$ if associated bits $A_x$ of A[n-1:0] and $B_x$ of B[n-1:0] are equal and a low sum bit S otherwise, $F1_n$ is set equal to the truth table for AB +$\overline{AB}$. Thus, using $F1_3F2_3$ as the appropriate 16-bit signal for equality, $F1_3$ is set equal to "10011001" and $F2_3$ is set equal to "00000000". In this manner, if and only if A[n-1:0]==B[n-1:0] will each and every sum bit S generated by respective ones of PLUs 32 and provided to adder 16 be high. $C_{in}$ to adder 16 is set equal to "1" and $C_{in}'$ to adder 16 is set equal to "0"). Thus, carry in $C_{in}$ will propagate across all n bits of adder 16, and thus cause $C_{out}'$ to be equal to "1", if and only if A[n-1:0]==B[n-1:0]. As such, equality comparison may be performed without the need for a multi-level tree structure of NOR gates as required by zero detection circuits employed in conventional equality detector circuits such as in ALU 10 of FIG. 1. Note that PLU 32 may, in other embodiments, perform a three-input equality comparison simply by setting (and then selecting) one of function signals $F1_n$ equal to "10000001".

The above described embodiment advantageously implements arithmetic, logic, and equality comparison operations using a single set of programmable logic units 32. By selectively providing ones of signals $F1_nF2_n$ to PLUs 32, each PLU 32 may not only operate as a three-input full adder but also may perform three-input logic operations (including but not limited to AND, OR, and XOR) and equality comparisons, thereby eliminating the need for n conventional full adders and a conventional equality detection circuit.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A structure for selectively implementing arithmetic, logic, and equality operations, said structure comprising:

a plurality of programmable logic units each coupled to receive respective bits of two or more input signals and each having one or more output ports; and a select multiplexer having a plurality of input ports coupled to receive a plurality of function signals and having an output port coupled to each of said programmable logic units, said select multiplexer providing a selected one of said function signals to each of said programmable logic units in response to one or more control signals, wherein each of said function signals comprises a string representative of the truth table for a particular one of said operations of said two or more input signals, each of said programmable logic units multiplexing said selected one of said function signals using said respective bits of said two or more input signals as control signals and generating at said one or more output ports a signal indicative of the selected operation of said two or more input signals.

2. The structure of claim 1 wherein each of said programmable logic units comprises:

a first input port coupled to receive said selected one of said function signals;

a second input port coupled to receive said respective bits of said two or more input signals;

a multiplexer having m input ports each being coupled to said first input port to receive an associated bit of said selected one of said function signals, n control terminals each coupled to said second input port to receive an associated bit of said two or more input signals, and an output terminal coupled to said one or more output ports, where $m=2^n$.

3. The structure of claim 1 further comprising an adder circuit having a plurality of input terminals each being coupled to an associated one of said output ports of said plurality of programmable logic units and having an output terminal.

4. A structure for selectively implementing arithmetic, logic and equality operations, said structure comprising:

n input ports for receiving n input signals each comprising a plurality of bits;

a plurality of programmable logic units (PLUs) each having a functional input port and n input terminals, each input terminal being coupled to receive an associated bit of each of said n input signals, respectively;

a first m-to-1 multiplexer having m input terminals for receiving m function signals, n control terminals for receiving n control signals, and an output terminal coupled to each of said function input ports, wherein each of said plurality of PLUs comprises a second m-to-1 multiplexer having m input terminals coupled to said function input port, n control terminals each of which being coupled to an associated one of said n input terminals, and an output terminal coupled to a first output terminal of said PLU.

5. The structure of claim 4 where each of said PLUs further comprises a third multiplexer having m input terminals coupled to said function input port, n control terminals each of which being coupled to an associated one of said n input terminals, and an output terminal coupled to a second output terminal of said PLU.

6. The structure of claim 5 further comprising an adder circuit having a plurality of first and a plurality of second input terminals coupled to associated first and second output terminals of said plurality of PLUs, respectively, and an output terminal.

7. A method for selectively performing various arithmetic, logic, and equality operations using a set of n programmable logic units, said method comprising:

applying two or more n-bit input signals in a bit-wise fashion to respective two or more input terminals of said n programmable logic units (PLUs);

generating a plurality of function signals each indicative of the truth table for a particular one of said operations;

providing a selected one of said function signals to each of said n PLUs so as to implement a selected one of said operations;

multiplexing said selected one of said function signals in each of said n PLUs using respective bits of said two or more input signals as control signals; and producing in response to said multiplexing step an output signal indicative of said selected one of said operations.

8. The method of claim 7 wherein said step of producing further comprises:

generating n intermediate signals in said n PLUs in response to said step of multiplexing; and combining said n intermediate signals into said output signal indicative of said selected one of said operations.

9. The method of claim 8 wherein said operations comprise AND gating, OR gating, XOR gating, subtraction, addition, and equality detection.

* * * * *